United States Patent
Kelliher

(10) Patent No.: US 6,469,680 B1
(45) Date of Patent: Oct. 22, 2002

(54) ANTENNA ARRANGEMENT

(75) Inventor: John Kelliher, Lewisham (GB)

(73) Assignee: Orange Personal Communications Services Limited, Bristol (GB)

(*) Notice: Subject to any disclaimer, the term of this patent is extended or adjusted under 35 U.S.C. 154(b) by 0 days.

(21) Appl. No.: 09/117,987

(22) PCT Filed: Jan. 31, 1997

(86) PCT No.: PCT/GB97/00297

§ 371 (c)(1),
(2), (4) Date: Oct. 10, 2000

(87) PCT Pub. No.: WO97/29558

PCT Pub. Date: Aug. 14, 1997

(30) Foreign Application Priority Data

Feb. 8, 1996 (GB) .............................. 9602532

(51) Int. Cl.⁷ ................................. H04B 7/10
(52) U.S. Cl. ................... 343/893; 343/725; 343/729
(58) Field of Search ................. 343/893, 810, 343/797, 725, 729, 730, 726, 727; 370/342

(56) References Cited

U.S. PATENT DOCUMENTS

| | | | | |
|---|---|---|---|---|
| 4,446,465 A | * | 5/1984 | Donovan | 343/797 |
| 5,138,328 A | | 8/1992 | Zibrik et al. | 348/702 |
| 5,486,836 A | * | 1/1996 | Kuffner et al. | 343/700 MS |
| 5,859,842 A | * | 1/1999 | Scott | 370/342 |

FOREIGN PATENT DOCUMENTS

| | | |
|---|---|---|
| EP | 108 816 | 5/1984 |
| EP | 656 697 | 6/1995 |
| EP | 691 703 | 1/1996 |
| EP | 766 414 | 4/1997 |
| FR | 2293635 | 7/1976 |
| GB | 306538 | 12/1929 |
| GB | 789879 | 1/1958 |
| GB | 800293 | 8/1958 |
| GB | 2199468 A | 7/1988 |
| GB | 2291271 A | 1/1996 |
| JP | 02 183634 | 7/1990 |

* cited by examiner

*Primary Examiner*—Don Wong
*Assistant Examiner*—James Clinger
(74) *Attorney, Agent, or Firm*—Knobbe, Martens, Olson & Bear LLP

(57) ABSTRACT

An antenna arrangement for use in a cellular mobile radio system, consisting of four receiving antenna arrays grouped into two branches (2, 4). The first branch consists of an antenna array (6) receiving vertically polarized signals, located adjacent an antenna array (8) receiving horizontally polarized signals. The second branch (4) consists of a similar arrangement (10, 12) spaced from the first branch to provide space diversity of the received signals. When a signal is received, the outputs from all four antenna arrays (6, 9, 10, 12) are fed to a combiner arrangement (14, 16, 18) to produce a space-diversity and polarization-diversity gain.

38 Claims, 2 Drawing Sheets

ANTENNA ARRANGEMENT

This invention relates to an antenna arrangement for transducing signals broadcast in a cellular mobile radio communications system, and in particular but not exclusively to such an arrangement for use in the uplink (mobile transmit to base station receive) of a cellular mobile radio communications system.

In a cellular mobile radio communications system, a number of base stations are disposed over an area notionally divided into a number of cells, each base station being associated with a cell. Each cell is assigned a number of radio frequency channels on which mobile units within the cell transmit and receive signals to and from the cell's base station. The frequency channels assigned to adjacent cells are generally different to permit frequency re-use.

Each mobile unit when in use may transmit a signal to the base station on an uplink of the communication system. The strength of the uplink signal received at the base station will vary according to the location of the mobile unit within the cell, and the received signal may be degraded as a result of multipath effects and a low signal to noise ratio on the uplink. One way to improve the received signal to noise ratio on the uplink is to improve the uplink receiving antenna diversity gain.

In environments such as rural environments the uplink receiving antenna gain remains an undesirable constraint on the cell size. In rural areas, only rarely if ever will the full capacity of frequency channels assigned to a cell be simultaneously in use, whilst there are unwanted gaps in the coverage of the available cells when the base stations are widely dispersed.

There are known various arrangements for improving the uplink gain of the base station receiving antenna array in a cellular mobile radio system. Second generation cellular systems commonly use two spaced antenna arrays in each base station sector for receiving the uplink signal with space-diversity. The signals received at the two spatially separated antenna arrays will have travelled different spatial paths from the mobile unit and hence will each arrive with different fading envelopes, and the signal received at one antenna array may be used to augment the signal received at the other. The antenna array outputs are combined to improve the uplink receiving antenna system gain.

To further improve uplink receiving antenna gain other that of the above arrangement, it has been proposed to use a four-branch space-diversity antenna arrangement. Four vertical polarization antenna arrays are spaced apart at the base station. Each of the four outputs from the spaced antenna arrays are combined to provide a higher space-diversity gain than that provided by the two-branch space-diversity antenna arrangement.

These space-diversity antenna arrangements utilise antennas receiving only the vertical polarization components of the uplink signal.

In another known uplink receiving antenna arrangement for a cellular mobile communications system, gain is improved by the use of polarization diversity at the base station. The vertically polarized signal component is received on one antenna array and a horizontally polarized signal component signal is received on a different antenna array. The two outputs are fed into a combiner to produce an output with a polarization diversity gain.

In accordance with the present invention there is provided antenna apparatus for receiving uplink signals from mobile units in a cellular mobile radio communications system, said arrangement comprising:

first antenna means for receiving an uplink signal at a first polarization;

second antenna means for receiving the uplink signal at a second polarization different to said first polarization;

third antenna means for receiving the uplink signal at a third polarization at a location spaced from said first antenna means by a distance sufficient for achieving space-diversity with respect to said first antenna means;

fourth antenna means for receiving the uplink signal at a fourth polarization, different to said third polarization, at a location spaced from said second antenna means by a distance sufficient for achieving space-diversity with respect to said second antenna means; and means for combining the uplink signal received at each of said antenna means to generate a combined received signal, wherein said second antenna means is located closer to said first antenna means than to said third antenna means, and said fourth antenna means is located closer to said third antenna means than to said second antenna means.

An uplink signal in a cellular mobile communications system will often have both vertical polarization and horizontal polarization components. For example, where the mobile unit is a hand-held mobile unit with an azimuthally inclined omni-directional antenna, the signal radiated from the mobile unit will in most directions have vertical and horizontal polarization components which vary according to the inclination at which the mobile unit is held. Consequently, both of these orthogonally-resolved signal components are generally received at a base station. Thus, with the present invention, it is possible to improve the diversity gain of the uplink receiving antenna, to achieve a gain comparable to that of the four-branch space-diversity arrangement.

Such an uplink diversity gain improvement at a base station of a cellular mobile radio communications system will effectively apply a radio link budget gain which serves to improve the operational range of the radio cells of the system. The radio link budget determines the levels of in-building coverage and street level coverage in a cell. An increase in cell range such as by enhanced gain in the uplink and higher transmit power in the downlink has a fundamental effect on the number of base station systems required in a system, and hence also the associated cost.

The visual size of an aerial at a base station, whether situated at the top of a building or on a purpose-built aerial platform, is an important factor when considering the environmental impact of a base station. Since each of a number of cellular mobile radio systems which may operate in a single territory requires a large number of base stations spaced throughout the territory (some placed in environmentally sensitive rural or urban areas) it is beneficial to provide an antenna arrangement capable of providing a higher uplink diversity receiving gain whilst maintaining an environmentally acceptable aerial size.

The present invention allows a base station antenna configuration to be considerably smaller than that of the four-branch space-diversity aerial. It can also be used to reduce the mechanical complexity of the physical antenna configuration.

An embodiment of the present invention will now be described, by way of example only, with reference to the accompanying drawings, wherein.

Figure 1:
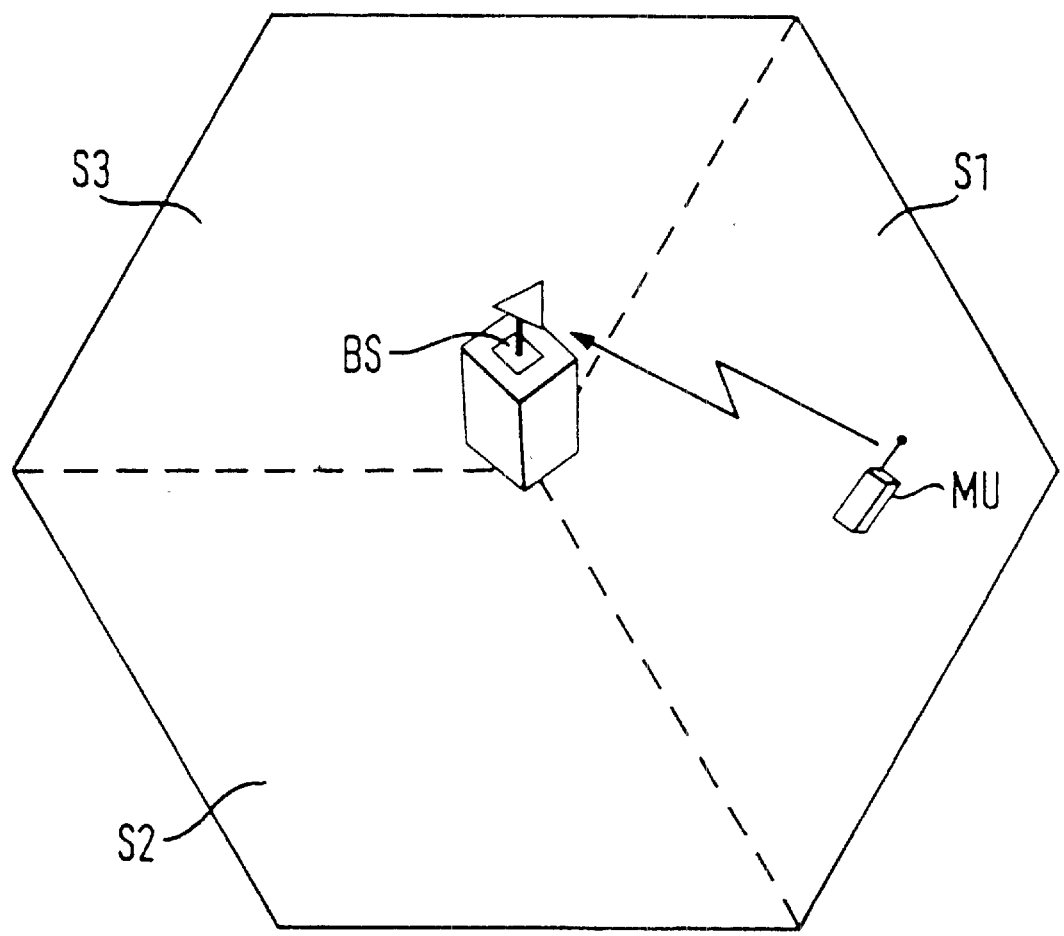
FIG. 1 depicts a tri-sectored radio communications cell.

Referring to FIG. 1, a base station BS operating in a TDMA system is located at the centre of a cell consisting of three 120° sectors S1, S2 and S3. Different sets of frequency channels are assigned to each sector. FIG. 1 also illustrates a mobile unit MU transmitting in sector Si on an uplink received by the base station BS.

When a mobile unit MU is assigned a frequency channel on which to communicate with base station BS, the mobile unit MU transmits its signal omnidirectionally into the surrounding environment. Some of the signal will travel directly to the base station BS and other parts of the signal will be reflected from environmental features (hills, buildings, water surfaces and so on), eventually reaching the base station BS. The signal received at the base station BS will generally arrive with different phases, and with different fading envelopes at the two points. The vertical polarization and horizontal polarization signal components are likely also to arrive at each point with different fading envelopes, since the two components will be differently accentuated by different paths of travel.

Figure 2:
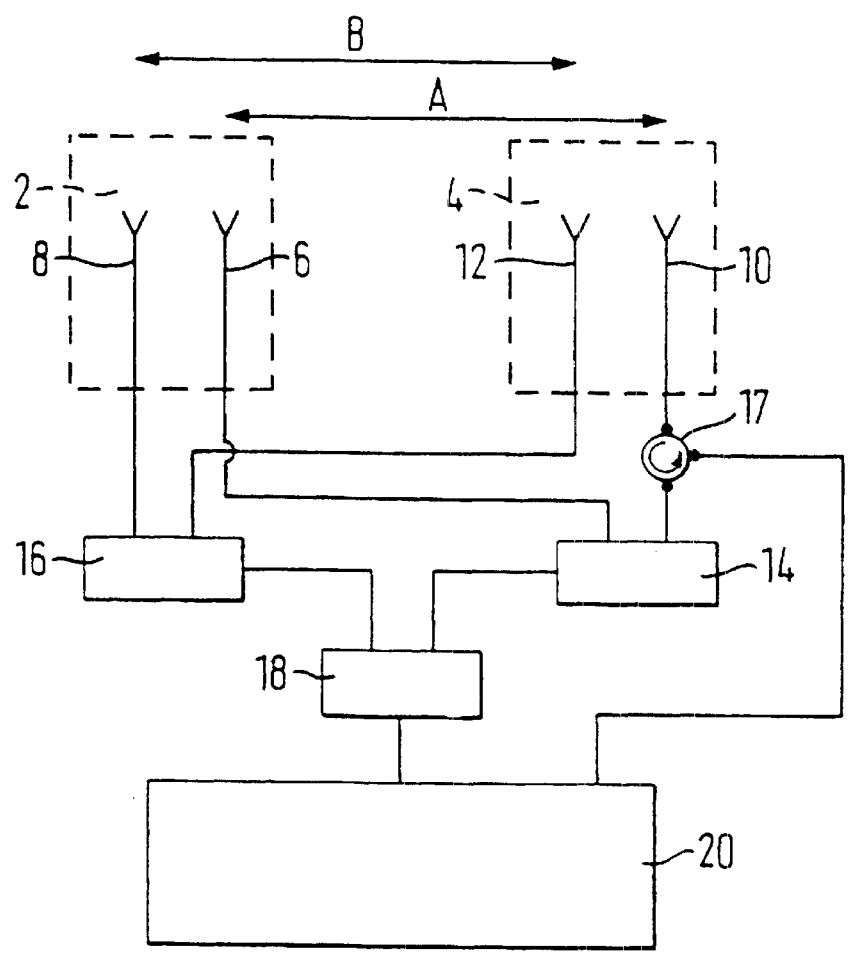
FIG. 2 is a block diagram showing the components of an embodiment of the invention.

Referring now to FIG. 2, an arrangement for use in one sector of a radio base station according to an embodiment of the present invention has two space-diversity antenna branches 2 and 4. Each branch comprises two generally orthogonal antenna arrays 6, 8 and 10, 12. One of the branches 2 has a vertical polarization antenna array 6, such as a dipole antenna array and a horizontal polarization array 8, such as a dipole antenna array. The second branch array 4 has a similar vertical polarization antenna array 10 and a horizontal polarization antenna array 12. Such dipole arrays consist of a number of radiating elements. The individual elements are connected via a network in each antenna array, with individual phase and amplitude adjustments for the purpose of beam shaping.

Outputs from each of the vertical polarization arrays 6, 10 are fed to a two-port combiner 14 via a three port circulator 17. Outputs from the two horizontal polarization arrays 8, 12 are fed to a second two-port combiner 16. These two two-port combiners 14, 16 (which have outputs both exhibiting space-diversity gain) are cascaded to a third two-port combiner 18, to produce a final combined output exhibiting both space-diversity and polarization diversity gains, which output is fed to the base station system 20, which then feeds signals to a mobile telephone switch (MSC). The combiners 14, 16 take account of the differing amplitudes and phases of the signals output from vertical antenna arrays 6, 10 and horizontal antenna arrays 8 12 respectively. The received signal output of all four antenna arrays 6, 8, 10, 12 are eventually combined for an increased uplink performance in combiner 18.

The base station system 20 also has an output which feeds signals into circulator 17 for transmission on the cell downlink via the vertical polarization array 10.

The vertical polarization antenna arrays 6, 10 are mutually spaced by a distance A sufficient to achieve a significant space-diversity gain when their signals are combined. This must be balanced against the size and associated cost limitations. Thus, the distance A is preferably greater than 6 times the average or approximate centre wavelength of the signals to be received, whereas in a preferred arrangement the distance A is of the order of 20 times that wavelength.

To achieve space-diversity between the horizontal polarization antennas arrays 8, 12, they are mutually spaced by a distance B, which for practical purposes should be at least 6 times the signal wavelength, and is preferably of the order of 20 times, to the signal wavelength. The distance between the vertical polarization array and the horizontal polarization array in a single space-diversity branch 2 or 4 is not of primary influence in the signal strength, except that the arrays should be sufficiently spaced to reduce mutual interference. However, in order to achieve a compact arrangement, the two antenna arrays 6, 8 and 10, 12 of each space-diversity branch 2 and 4 should be located relatively close together compared to the space-diversity spacing A or B.

Figure 3:
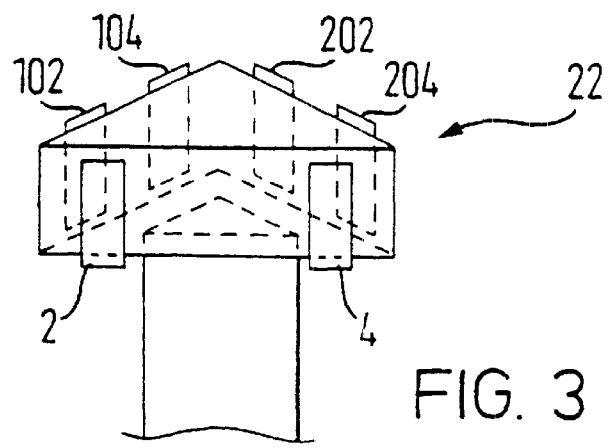
FIG. 3 is a perspective view of an antenna configuration incorporating the present invention.

Referring now to FIG. 3, an arrangement as shown in FIG. 2 is used as the uplink receiver, and the downlink transmitter, for each of three sectors in a tri-sectored cell base station array 22. Diversity antenna branches 2, 4 transmit and receive signals in one of three 120° sectors making up the cell. Other antenna branches 102, 104 and 202, 204 are spaced around the base station antenna configuration 22 at 120° intervals to service the remaining two sectors. Herein the components of only one sector have been described. Similar arrangements would be employed in the other sectors' antenna arrays 102, 104, 202, 204.

An arrangement as described can provide an output having a gain in excess of approximately 3 dB, compared to a conventional space-diversity antenna configuration in a tri-sectored cell. This can correspond to an increase of circular street level coverage cell area of 45% in a rural quasi-open (RQO) environment. Hence, the radius of such a circular cell can be increased to approximately 11 km in the DCS1800 cellular mobile radio system.

Thus, an antenna configuration according to the present invention can provide a larger uplink cell size due to the use of space-diversity and polarization diversity in the antenna array. The increase in uplink cell size may require a corresponding improvement the downlink radio link budget. This can be achieved by an increase in the transmitted radiated power on the downlink, or by improving the mobile unit receive sensitivity.

In the present case, the downlink transmitting antennas preferably use only one polarization component. In the described embodiment the vertical polarization antenna array 10 is supplied with a transmitting signal from the base station system 20 via the circulator 17. Of course a separate antenna array or arrays could be used for the downlink transmission of signals to the mobile units, although this will increase the size and cost of the base station antenna configuration.

It is thought that the present invention will be of most use in predominantly rural environments, where the uplink cell size is often a constraining factor on the performance of a cellular mobile radio system. The invention is thought to be of primary application in respect of macrocellular systems but the invention would also be advantageous in megacellular, microcellular and picocellular systems.

The invention may be applied in any of the current cellular mobile radio system specifications, since the uplink antenna gain parameter is not standardised. The invention is applicable in particular, but not exclusively, in the 300 MHz–3 GHZ range of radio frequencies. This invention may therefore be applied to all of the major operating cellular mobile radio systems, including NMT-450 (operating at around 450 MHz); GSM, TACS, AMPS, NMT-900 (operating at around 900 MHz); DCS1800 (operating at around 1800 MHz); and DCS 1900 (operating at around 1900MHz).

It is to be noted that although in the illustrated embodiment three cascaded two-port combiners 14, 16, 18 are utilised in a given combination or arrangement, three two-port combiners could be employed to combine signals from the antenna array 6, 8, 10, 12 in any permutation. In the alternative, the four signals could be fed into a four-port combiner and/or a digital beamformer which adjusts the amplitudes and phases on the four input signals so as to effect an improvement in uplink performance.

The combiners used are preferably maximal ratio or optimal combiners, but may be any other known type of combiners which produce a combined signal gain. Switched combiners, using pure selection combining, or fixed or variable threshold selection, may also be employed.

Although an arrangement used in tri-sectored cellular radio communications systems has been described, the invention is applicable to systems using cells having other numbers of sectors, or having no sectors.

It will be appreciated that other modifications or variations could be employed without departing from the spirit or scope of the invention.

What is claimed is:

1. Antenna apparatus for receiving uplink signals from mobile units in a cellular mobile radio communications system, said arrangement comprising:
   first antenna means for receiving an uplink signal at a first polarization;
   second antenna means for receiving the uplink signal at a second polarization different to said first polarization;
   third antenna means for receiving the uplink signal at a third polarization at a location spaced from said first antenna means by a distance sufficient for achieving space-diversity with respect to said first antenna means;
   fourth antenna means for receiving the uplink signal at a fourth polarization, different to said third polarization, at a location spaced from said second antenna means by a distance sufficient for achieving space-diversity with respect to said second antenna means; and
   means for combining the uplink signal received at each of said antenna means to generate a combined received signal,
   wherein said second antenna means is located closer to said first antenna means than to said third antenna means, and
   said fourth antenna means is located closer to said third antenna means than to said second antenna means.

2. Apparatus according to claim 1, wherein said second polarization is substantially perpendicular to said first polarization.

3. Apparatus according to claim 2, wherein said first antenna means is arranged to receive the uplink signal at a substantially vertical polarization, and said second antenna means is arranged to receive the uplink signal at a substantially horizontal polarization.

4. Apparatus according to any of claims 1 to 3, wherein said third antenna means is arranged to receive the uplink signal at a polarization substantially parallel to said first polarization, and said fourth antenna means is arranged to receive the uplink signal at a polarization substantially parallel to said second polarization.

5. Apparatus according to any of claims 1 to 3, wherein said third antenna means is arranged to transmit downlink signals to mobile units in the system.

6. Apparatus according to claim 5, wherein said second and fourth antenna means are arranged not to transmit downlink signals to mobile units in the system.

7. Apparatus according to claim 5, wherein said first antenna means is arranged not to transmit downlink signals to mobile units in the system.

8. Apparatus according to any preceding claims 1 to 3, wherein said combining means comprises three cascaded two-port combiners.

9. Apparatus according to any of claims 1 to 3, wherein said combining means comprises a four-port combiner.

10. Apparatus according to any preceding claims 1 to 3, wherein each of said antenna means is arranged to receive uplink signals from mobile units in one of a plurality of sectors disposed about a base station of said system.

11. Apparatus comprising a plurality of sets of the apparatus of claim 10, each said set serving one of said sectors.

12. Apparatus according to claim 11, wherein said base station serves a tri-sectored cell, each sector being served by one said set.

13. Apparatus according to any of claims 1 to 3, wherein said uplink signals are received at frequencies between 300 MHz and 3 GHz.

14. Apparatus according to claim 4, wherein said third antenna means is arranged to transmit downlink signals to mobile units in the system.

15. Apparatus according to claim 6, wherein said first antenna means is arranged not to transmit downlink signals to mobile units in the system.

16. Apparatus according to claim 4, wherein said combining means comprises three cascaded two-port combiners.

17. Apparatus according to claim 5, wherein said combining means comprises three cascaded two-port combiners.

18. Apparatus according to claim 6, wherein said combining means comprises three cascaded two-port combiners.

19. Apparatus according to claim 7, wherein said combining means comprises three cascaded two-port combiners.

20. Apparatus according to claim 4, wherein said combining means comprises a four-port combiner.

21. Apparatus according to claim 5, wherein said combining means comprises a four-port combiner.

22. Apparatus according to claim 6, wherein said combining means comprises a four-port combiner.

23. Apparatus according to claim 7, wherein said combining means comprises a four-port combiner.

24. Apparatus according to claim 4, wherein each of said antenna means is arranged to receive uplink signals from mobile units in one of a plurality of sectors disposed about a base station of said system.

25. Apparatus according to claim 5, wherein each of said antenna means is arranged to receive uplink signals from mobile units in one of a plurality of sectors disposed about a base station of said system.

26. Apparatus according to claim 6, wherein each of said antenna means is arranged to receive uplink signals from mobile units in one of a plurality of sectors disposed about a base station of said system.

27. Apparatus according to claim 7, wherein each of said antenna means is arranged to receive uplink signals from mobile units in one of a plurality of sectors disposed about a base station of said system.

28. Apparatus according to claim 8, wherein each of said antenna means is arranged to receive uplink signals from mobile units in one of a plurality of sectors disposed about a base station of said system.

29. Apparatus according to claim 9, wherein each of said antenna means is arranged to receive uplink signals from mobile units in one of a plurality of sectors disposed about a base station of said system.

30. Apparatus according to claim 4, wherein said uplink signals are received at frequencies between 300 MHz and 3 GHz.

31. Apparatus according to claim 5, wherein said uplink signals are received at frequencies between 300 MHz and 3 GHz.

32. Apparatus according to claim 6, wherein said uplink signals are received at frequencies between 300 MHz and 3 GHz.

33. Apparatus according to claim 7, wherein said uplink signals are received at frequencies between 300 MHz and 3 GHz.

34. Apparatus according to claim 8, wherein said uplink signals are received at frequencies between 300 MHz and 3 GHz.

35. Apparatus according to claim 9, wherein said uplink signals are received at frequencies between 300 MHz and 3GHz.

36. Apparatus according to claim 10, wherein said uplink signals are received at frequencies between 300 MHz and 3GHz.

37. Apparatus according to claim 11, wherein said uplink signals are received at frequencies between 300 MHz and 3 GHz.

38. Apparatus according to claim 12, wherein said uplink signals are received at frequencies between 300 MHz and 3 GHz.

* * * * *